United States Patent Office 2,909,156
Patented Oct. 20, 1959

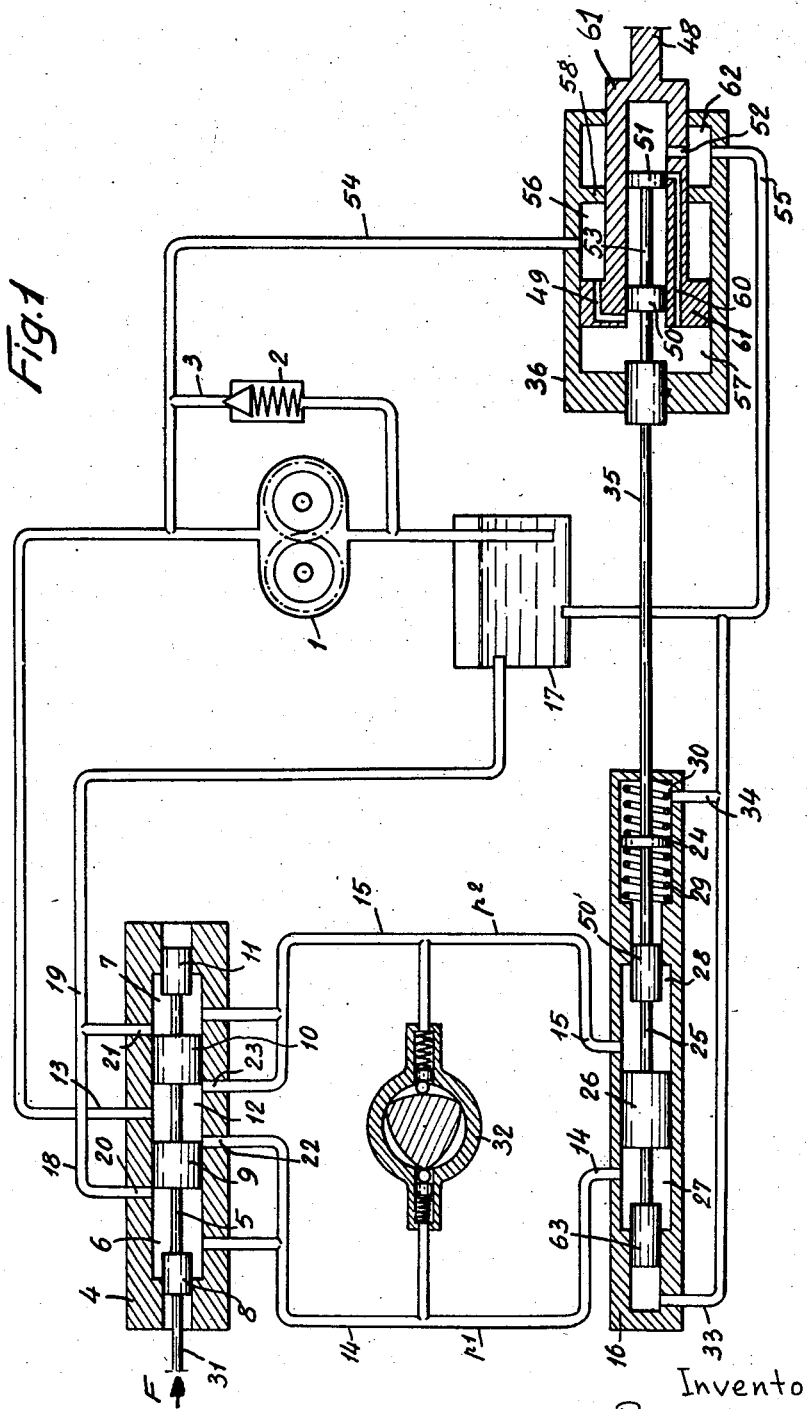

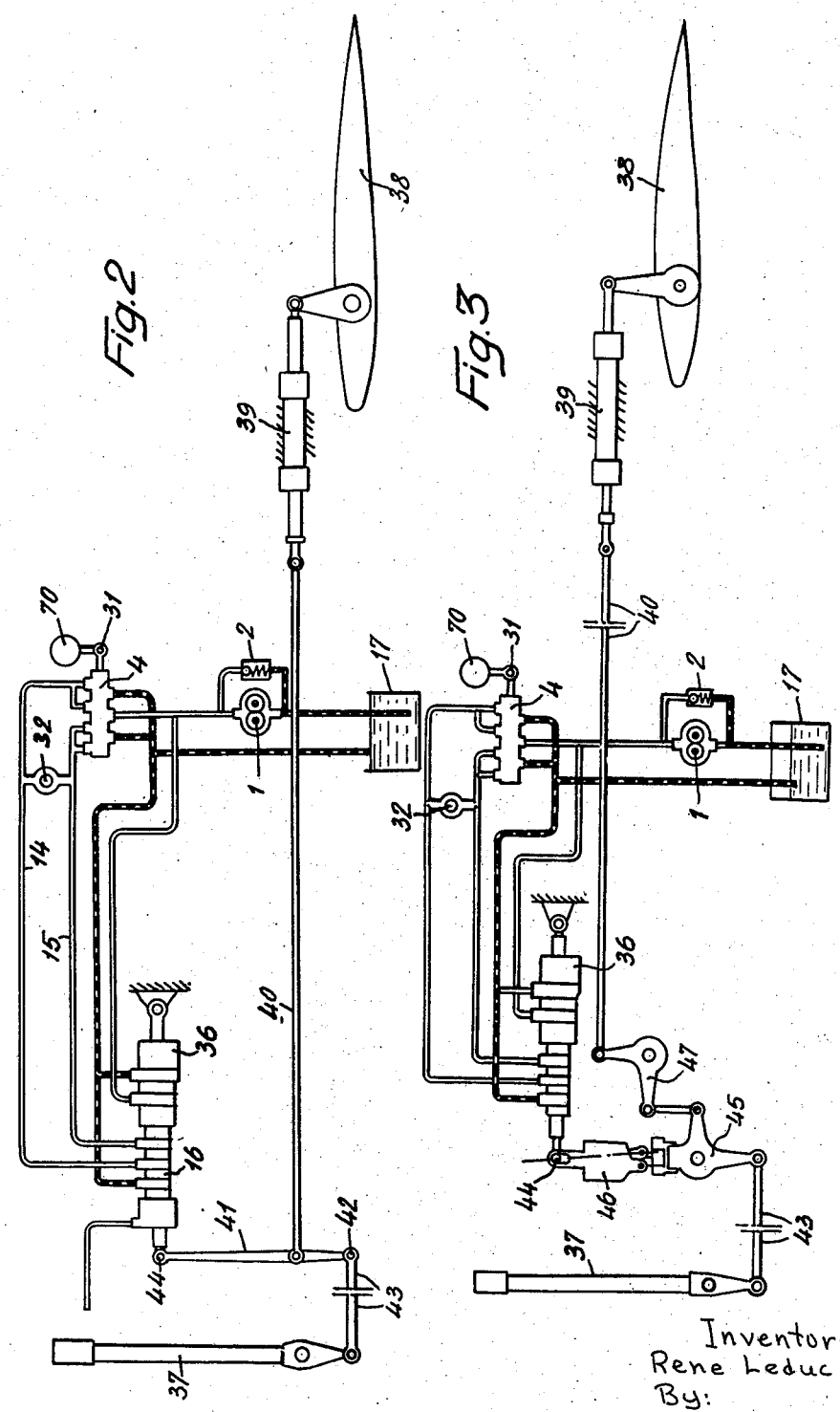

2,909,156

PRESSURE FLUID FOLLOW-UP SERVOMOTOR SYSTEM

René Leduc, Argenteuil, France

Application May 19, 1955, Serial No. 509,662

Claims priority, application France May 21, 1954

1 Claim. (Cl. 121—41)

The present invention relates to a hydraulic control apparatus of a type suitable for use in modern aircraft, although it is to be understood that the present invention is not limited to use with aircraft.

In an aircraft which is manually controlled by the pilot it sometimes happens that forces outside of the aircraft act on its control elements to shift these elements independently of their movement by the pilot.

It is an object of the present invention to provide a hydraulic control apparatus which will automatically correct undesired movements of elements, such as aerofoil elements, of an aircraft without interfering with the manual control of these elements.

Also, it is an object of the present invention to provide a hydraulic control apparatus capable of converting an extremely small force into a substantial movement of an element of the control apparatus.

A further object of the present invention is to combine a hydraulic control apparatus of the above type with a hydraulic jack.

Another object of the invention is to provide substantial movement of a hydraulic jack with an extremely small movement of fluid of a hydraulic control apparatus connected to the hydraulic jack.

The objects of the present invention also include the provision of a structure capable of accomplishing all of the above objects and, at the same time, made up of simple and ruggedly constructed parts which are easy to assemble and disassemble and which are very reliable in operation.

With the above objects in view, the present invention mainly consists of a hydraulic control apparatus which includes an elongated cylinder and an elongated rod means extending along the axis of the cylinder and carrying a piston which slidably engages the inner surface of the cylinder. A pair of conduits communicate with the cylinder, respectively, at opposite sides of the piston so that when one of the conduits communicates with a fluid under high pressure, and the other of the conduits communicates with a fluid under low pressure, the piston and rod means therewith will be shifted in one direction in the cylinder and so that the piston and rod means will be shifted in an opposite direction when the other conduit communicates with a fluid under high pressure and when the said one conduit communicates with a fluid under low pressure. A pressure means operatively engages this rod means for yieldably maintaining the piston in an equilibrium position ready for movement in either of the above directions, and a hydraulic detecting means communicates with the conduits for selectively placing the same respectively in communication with a fluid under high pressure and a fluid under low pressure when a small force acts on the detecting means so that this small force is converted into a substantial movement of the piston and rod means.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which Fig. 1 is a schematic illustration of a hydraulic control apparatus constructed in accordance with the present invention;

Fig. 2 schematically illustrates the manner in which a different type of hydraulic control apparatus of the present invention is interconnected with a manual control structure of an aircraft and with an aerofoil element of an aircraft;

Fig. 3 shows a slightly different embodiment of the structure of Fig. 2; and

Figure 4:
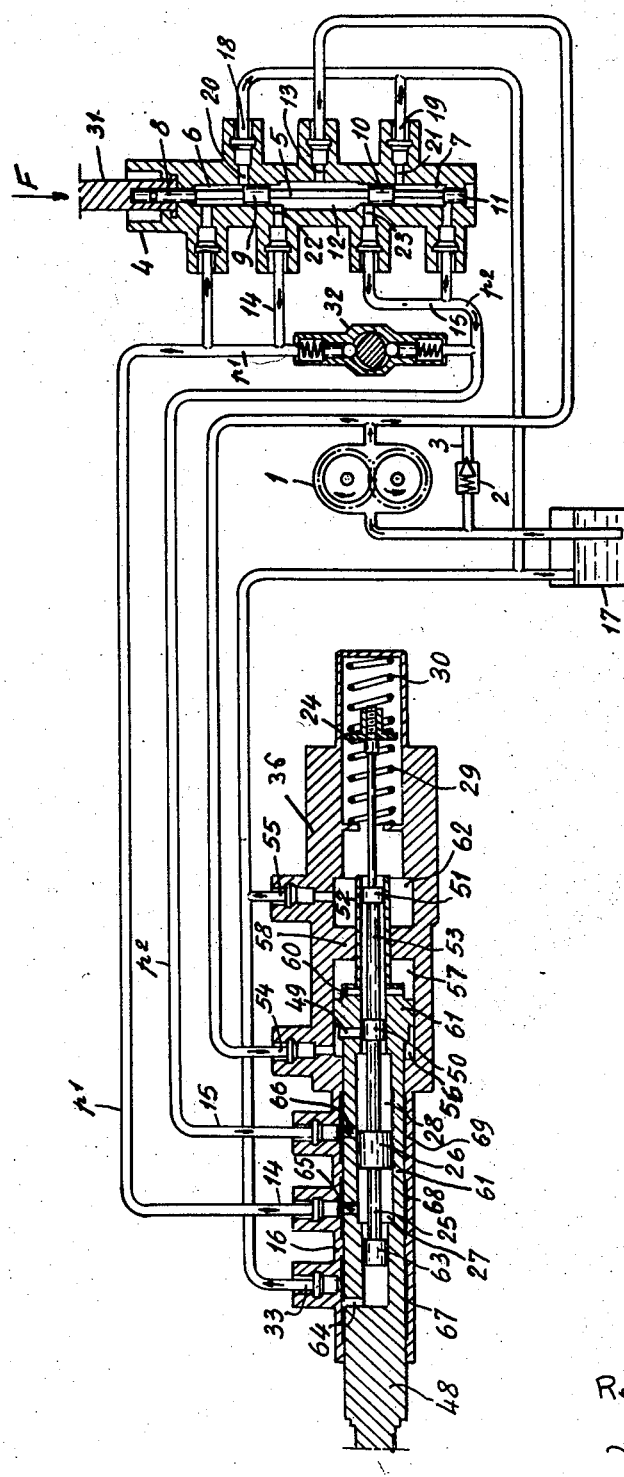
Fig. 4 is a schematic illustration of a different embodiment of the structure of Fig. 1.

Referring to Fig. 1, it will be seen that the structure of the invention includes a source of fluid under relatively high pressure in the form of a pump 1, which may be a gear pump. A bypass 3 bypasses the pump 1 and includes a valve 2, diagrammatically shown in Fig. 1, this valve 2 together with the bypass 3 maintaining the fluid discharged by the pump at a predetermined pressure in a known way. Any other device for providing fluid at a predetermined pressure may be used. The discharge conduit 13 of the pump 1 communicates with the cylinder 4 of the hydraulic detecting means which detects the force F, diagrammatically indicated in Fig. 1. A rod 5 extends along the axis of the cylinder 4 and carries pistons 8—11, all of which slidably engage the inner surface of the cylinder 4. The pistons 8 and 11 are identical and the pistons 9 and 10 are identical, pistons 8 and 9 forming one pair of pistons which are separated from the pair of pistons 10 and 11 by the intermediate chamber 12 in cylinder 4 which is included between the pistons 9 and 10. The pair of pistons 8 and 9 define between themselves an outer chamber 6 in the cylinder 4 and the pair of pistons 10 and 11 define between themselves an outer chamber 7 within the cylinder 4. The intermediate chamber 12 is in permanent communication with the conduit 13 supplied by the pump 1 with a fluid under high pressure. Chambers 6 and 7 are in permanent communication with conduits 14 and 15, respectively, these conduits leading to a cylinder 16 of a hydraulic means for converting the force F, even when the latter is extremely small, to a substantial movement of an element within the cylinder 16 as described below.

Chamber 6 communicates through the opening 20 in the wall of cylinder 4 with a conduit 18 which forms an extension of a conduit 19 leading to a tank 17 provided with fluid to be pumped by the pump 1, so that the conduit 18 serves as a source of fluid under low pressure for the chamber 6. Chamber 7 communicates with the conduit 19 through the opening 21 in the wall of cylinder 4. It will be noted from Fig. 1 that the pistons 9 and 10 are very close to the openings 20 and 21, respectively, and may even partially close these openings in the position of the parts shown in Fig. 1 so that upon movement of the rod 5 in either direction, one of these openings will be fully opened and the other will be fully closed. The intermediate chamber 12 communicates through conduits 22 and 23 respectively with the conduits 14 and 15, and it will be noted that these conduits 22 and 23 are partially closed by the pistons 9 and 10, respectively, in the rest position of the parts shown in Fig. 1, so that upon movement of the rod 5 in either direction one of the conduits 22 and 23 will be closed while the other will be open.

The cylinder 16 accommodates an elongated rod 25 which extends along the axis of the cylinder 16 and which carries pistons 63, 26 and 50', all of which slidably engage the inner surface of the cylinder 16. The piston 26 separates chambers 27 and 28 in the cylinder 16 from each other, and it will be noted that the conduits 14 and 15, respectively, communicate with the chambers 27 and 28. The pistons 63 and 50' are of equal diameter so that the fluid in the chambers 27 and 28 act on the same effective areas. The rod 25 further carries a piston 24, one side of which engages a coil spring 29 and the other side of which engages a coil spring 30. Coil spring 29 abuts against a shoulder of the cylinder 16 and coil spring 30 abuts against the right end wall of the cylinder 16, as viewed in Fig. 1, so that the springs 29 and 30 cooperate with the piston 24 to yieldably maintain the piston 26 in the equilibrium position indicated in Fig. 1. All of the free spaces within the cylinder 16 are filled with fluid and it will be noted that the fluid on the left side of piston 63, as viewed in Fig. 1, communicates through conduit 33 with the tank 17, while the fluid on the right side of piston 50' and surrounding the springs and piston 24 communicates through conduit 34 with the conduit 33.

The above described structure operates as follows:

If an extremely small force $\Delta F$ acts in the direction of the arrow indicated in Fig. 1 on the extension 31 of rod 5, this rod 5 will be displaced to the right, as viewed in Fig. 1, through an extremely small distance, and the result will be that the opening 21 is closed to a greater degree by piston 10 and the conduit 22 is closed to a greater degree by piston 9 while the opening 20 and the conduit 23 are opened to a greater degree. As a result, the conduit 14 communicates through conduit 18 with the tank 17 to have the fluid therein maintained at a low pressure $P_1$, while the conduit 15 receives fluid under high pressure $P_2$ from the conduit 13. This operation satisfies the relationship:

$$F = (P_2 - P_1)k$$

in which $k$ is the area of an annular section corresponding to the difference between the diameter of pistons 8 and 9. Of course, the difference between the diameter of the pistons 10 and 11 is the same. The value $(P_2 - P_1)$ is thus inversely proportional to $k$ and as a result the hydraulic detector means formed by elements 4—11 is a device capable of transforming an extremely small variation in force $\Delta F$ into a pressure differential which is substantial and which depends only upon the dimensional characteristics of the structure.

The pressures $P_1$ and $P_2$ are applied to the fluid in chambers 27 and 28, respectively, and thus these pressures act against the faces of the pistons in these chambers to displace the rod 25 and pistons carried thereby against the influence of one of the springs 29 or 30 through a distance $\Delta x$ which is proportional to $(P_2 - P_1)$ times a coefficient which depends only upon the characteristics of the springs 29 and 30 and the surfaces of the pistons. In the above described example where the force F displaces rod 5 to the right, as viewed in Fig. 1, the piston 26 will of course be displaced to the left and the spring 29 will be compressed.

Thus, the structure of the invention is capable of transforming an extremely small variation of force $\Delta F$ into a substantial displacement $\Delta x$ with a sensitivity which depends only upon the dimensional characteristics of the structure.

In order to eliminate frictional forces a pulsator 32, or its equivalent, is provided in the fluid circuit in accordance with the present invention, and preferably this pulsator 32 is located between the conduits 14 and 15, as indicated in Fig. 1. This pulsator may be of any appropriate type and is diagrammatically illustrated in Fig. 1. This pulsator includes the rotary cam shown in Fig. 1 which acts during its rotation on the two small ball members shown in Fig. 1 to displace the latter horizontally so as to displace the small pistons engaging these ball members and acted upon by the springs shown in Fig. 1 so as to maintain the ball members in engagement with the rotary cam. Each time the latter moves one of the small pistons into the cylinder in which it slides and away from the axis of rotation of the cam the pressure in one of the lines 14 or 15 is momentarily increased. Thus, in the position of the pulsator shown in Fig. 1, the left small piston of the pulsator has just reached the end of its displacement toward the line 14 to momentarily increase the pressure therein, and during the continued rotation of the cam the right small piston of the pulsator of Fig. 1 will be displaced toward the right to increase momentarily the pressure in the line 15. It is also possible to eliminate friction with any other suitable means, such as, for example, means impelling a rotary motion, around its axis, to the rod 5.

The rod 35 which forms an extension of the rod 25 may be used to control any desired structure. In the example shown in Fig. 1, and in accordance with the present invention, this device which is controlled by the above described structure is a hydraulic jack or servo-control of any known type, such as those described in French Patents Nos. 1,003,822 and 1,034,741 in the name of René Leduc.

Thus, it will be seen that in Fig. 1 the hydraulic jack includes an outer cylinder 36 in which a piston 61 reciprocates. The rod 35 has an extension 53 extending along the axis of the cylinder 36 and carries pistons 50 and 51 which are slidable within the cylindrical bore of the piston 61, as indicated in Fig. 1. The piston 61 defines with the inwardly extending annular flange 58 which slidably engages the piston 51, a chamber 56 which communicates through the conduit 54 with the pump 1 to receive fluid under pressure therefrom. A bore 49 in the piston 61 provides communication between chamber 56 and chamber 57 on the left side of piston 61 within the cylinder 36. The piston 61 is also formed with a passage 60 communicating with chamber 57 and with the inner bore of the piston 61, the right end of the passage 60, as viewed in Fig. 1, being closed in the position of the parts shown in Fig. 1 by the piston 51. The piston 61 defines with the annular flange 58 a chamber 62 which communicates through the conduit 55 with the tank 17, and it will be noted that the piston 61 is formed with an opening 52 communicating with the chamber 62 to maintain the fluid in piston 61 to the right of piston 51, as viewed in Fig. 1, at a low pressure. The extension 48 of piston 61 is linked to any element to be controlled such as an aerofoil element on an aircraft.

In the position of the hydraulic jack shown in Fig. 1, the parts are in equilibrium with a force acting to the left, as viewed in Fig. 1, on element 48 being added to the force of the fluid in chamber 56 which tends to urge the piston 61 to the left in order to exactly balance the force of the fluid in chamber 57 tending to move the piston 61 to the right. In this way the hydraulic jack is maintained in equilibrium. If the rod 25 is shifted to the right, then the rod portion 53 also shifts to the right and the piston 61 simply follows this movement, the fluid in chamber 56 flowing through passage 49 into chamber 57 so that the volume of chamber 57 increases while the volume of chamber 56 decreases. On the other hand, if the rod 25 is moved to the left, the right end of passage 60, as viewed in Fig. 1, is opened to place the chamber 57 at low pressure and the piston 61 then follows the rod portion 53 to the left until the parts again assume their equilibrium position. It should be noted that the extent of movement of the rod 25 is limited by the springs 29 and 30.

Fig. 2 diagrammatically illustrates how the structure of the invention may be mounted in an aircraft, and in Fig. 2 the cylinder 16 and structure carried thereby is combined with the cylinder 36 of the hydraulic jack and the structure carried thereby in a manner described below in connection with Fig. 4. Except for this change the above described structure of Fig. 1 is included in Fig. 2 and, while the conduits may be shown in Fig. 2 in a somewhat different arrangement, it will be appreciated by a comparison of Fig. 2 with Fig. 1 that the same hydraulic interconnections are provided, the low pressure lines being indicated in Fig. 2 in the shaded conduits.

As may be seen from Fig. 2, the control stick 37, which is manually operated by the pilot, acts on the aerofoil element 38 of the aircraft through any servo-mechanism 39 of a suitable construction, which is itself actuated by the rod 40 linked to the stick 37 through the medium of lever 41 and link 43, link 43 being pivotally connected to the bottom end of stick 37 and to the bottom end of lever 41 at 42. The other end 44 of the lever 41 is connected to what corresponds to extension 48 of piston 61 of Fig. 1, as will be apparent from the description below, so that as a result, with the arrangement of Fig. 2, as long as no outside force F acts on the aircraft the top end 44 of lever 41 remains stationary and element 38 is manually controlled. In this case the lever 41 may be considered as pivoted at its top end on a stationary pivot. However, should an outside force of the above type act on the aircraft, then the structure of the invention will shift the top end 44 of lever 41 to compensate for such a force, and assuming that the stick 37 remains stationary at this time it will be seen that the lever 41 now pivots about its bottom end to automatically adjust the aerofoil 38. This force which acts on the aircraft may be derived from any suitable device such as a gyroscope and aneroid capsule, or any other suitable system capable of creating a force in response to movement of the aircraft. The aerofoil element to be controlled may be the elevators, the rudders or the aileron of the aircraft.

The arrangement shown in Fig. 3 is identical with that of Fig. 2 except that the link 43 is connected to the rod 40 through a pair of interconnected bellcranks 45 and 47. The point 44' at the end of the structure of the invention is connected to an automatic yieldable return device 46 which is in turn connected to the bellcrank 45, as diagrammatically indicated in Fig. 3. This device 46 serves to automatically return the control 37 to a central or rest positon and may have the structure shown in French Patent No. 1,049,257 in the name of René Leduc. Except for these differences, the structure of Fig. 3 is identical with that of Fig. 2. It will be seen, however, that with the arrangement of Fig. 3 the rest position of the control stick 37 is determined through the device 46 by the structure of the invention.

Fig. 4 shows the details of how the cylinders 16 and 36 may be combined together with the structure housed by these cylinders. The advantage of this compact arrangement of the structure is that only an extremely small amount of fluid flowing along the conduits 14 and 15 is required to provide a displacement of the hydraulic jack which has the desired magnitude.

Referring to Fig. 4 it will be seen that the cylinder 16 forms an extension of the cylinder 36 and houses the piston 61 which itself forms a cylinder along whose axis the rod 25 extends. Thus, the chambers 27 and 28 respectively located on opposite sides of the piston 26 carried by rod 25 are now located directly within the hollow piston 61, the pistons 63 and 50 slidably engaging the inner surface of the piston 61. The springs 29 and 30 are engaged by parts integral with or fixed to the cylinder 36 and act on the rod 25 in the same way as the springs 29 and 30 of Fig. 1, these springs engaging a disc 24 in Fig. 4 in the same way as in Fig. 1. The hydraulic detector means 4—11 of Fig. 4, identical with that of Fig. 1, and the conduits 14 and 15 communicate with annular chambers 68 and 69 formed in the inner surface of cylinder 16 in Fig. 4 and surrounding the piston 61, the latter being formed with openings 65 and 66 respectively communicating with chambers 68 and 69, so that in this way the fluid in the lines 14 and 15 communicates through chambers 68 and 69, respectively, and through openings 65 and 66, respectively, with the chambers 27 and 28, respectively, so that the force F acting on the rod 5 through the extension 31 thereof causes displacement of rod 25 and piston 26 with respect to piston 61 in the embodiment of Fig. 4.

In the position of the parts shown in Fig. 4 the piston 26 has just barely closed the opening 66 which communicates with the fluid under pressure. Thus, an extremely small displacement of the piston 26 to the left, as viewed in Fig. 4, places the chamber 28 in communication with the liquid under pressure.

It will be noted that with the embodiment of Fig. 4, instead of two pistons 50 and 50', as shown in Fig. 1, a single piston 50 is provided which cooperates with piston 26 to provide chamber 28 on the one hand, and which cooperates with passage 49 in the same way as piston 50 of Fig. 1 to provide displacement of the piston 61.

The remaining elements of Fig. 4 within cylinder 36 correspond to those of Fig. 1 within the cylinder 36 and operate in the same way. It will be seen that with the structure of Fig. 4, when the pressure differential $(P_2-P_1)$ provides a relatively small displacement of rod 25 with respect to piston 61, all of the structure associated with rod 25 and piston 61 is displaced, as is described in detail below, until the springs 29 and 30 are stressed sufficiently to stop such movement and, as the displacement of rod 25 relative to piston 61 is extremely small with the embodiment of Fig. 4, the amount of liquid flowing through the conduits 14 and 15 to provide this displacement also is extremely small and, in fact, practically zero. The advantage of this arrangement is an extremely great speed of action since the path of flow in the detector 4—11 can be reduced to an extremely small value which is practically zero and, as a consequence, an infinitely small displacement of the rod 5 of the hydraulic detector means (on the order of only a few hundredths of a millimeter) is converted into a substantial displacement of the piston 61.

The elements of Fig. 4 which correspond to those of Fig. 1 are indicated with the same reference characters and it will be seen that the structure of Fig. 4 includes the rod means 35—53, the differential piston 61 connected through extension 48 to the element to be controlled, the pistons 50—51 covering and uncovering the openings 49—52, the opening 49 being connected to the fluid under pressure through the conduit 54 which communicates with chamber 57 which is in communication with passage 49 and the opening 52 communicating through chambers 62 with conduit 55 leading to the tank 17. The opening 52 of Fig. 4 communicates in the same way as in Fig. 1 with the passage 60 to connect chamber 57 to the tank 17, and the orifice 52 and chamber 62 being separated from the chamber 56 by the annular flange 58 which slidably engages the outer surface of the piston 61 in the same way as in Fig. 1.

The following explanation of the operation of the structure gives an understanding of how with a small displacement of rod 25 with respect to piston 61 an extremely small force F acting upon the hydraulic detector and an extremely small flow of liquid are sufficient to provide a relatively large displacement of the element 48 connected to the part which is to be controlled.

When an extremely small force F, in the direction of the arrow shown in Fig. 4, for example, acts on the rod 8, the opening 23 will be uncovered and the opening 22 will be closed, so as to provide a high pressure in the conduit 15 and a low pressure in the conduit 14 which at this time communicates with the tank 17. As a result the chamber 28 of the hydraulic means 16 has the liquid therein placed at a higher pressure than the liquid in the chamber 27, and the rod 25 is thus displaced to the left, as viewed in Fig. 4. A very small displacement of the piston 26 to the left with the flow of a very small quantity of liquid may enter the chamber 28 results in a displacement of the piston 50 of Fig. 4 to the left, and as a result the passage 49 is opened so that the liquid under high pressure acts upon the piston 61 to displace the latter to the left, as viewed in Fig. 4, and as a result the piston 61 shifts together with the rod 25, the elements 61 and 25 moving as a unit and without any relative displacement at this time. Under these conditions, the extremely small quantity of liquid introduced into the chamber 28 has sufficed to provide the required movement of the control element 48, while with the embodiment of Fig. 1, the piston 61 will continue to move only as long as the rod 25 moves in its housing. It is evident therefore that a greater quantity of liquid is required to produce the desired results with the embodiment of Fig. 1 than with the embodiment of Fig. 4. In other words, with the embodiment of Fig. 4 the sensitivity of the response to the forces F and the rapidity of this response are greatly improved.

The movement of the elements 25 and 61 to the left, as viewed in Fig. 4, continues while the spring 29 becomes compressed until the resistance of the spring 29 to this movement exactly equals the pressure differential $(P_2-P_1)$ prevailing in the conduits 14 and 15. At this moment the rod 25 stops moving while the piston 61 still continues to move until the passage 49 is closed by the piston 50 as a result of the relative movement of the passage 49 with respect to the piston 50, and then the piston 61 stops moving.

The above described movements take place in the opposite direction when the direction of the force F is the reverse of that shown in Fig. 4.

In addition, the openings 65 and 66 and chambers 68 and 69 enable conduits 14 and 15 to communicate with chambers 27 and 28, respectively, in the embodiment of Fig. 4. The piston 61 is provided with an opening 64 communicating with the chamber to the left of piston 63 and with annular chamber 67 formed in the outer cylinder portion 16, this chamber 67 communicating through conduit 33 with the tank 17. The chambers 67—69 are long enough to provide the desired displacement of the assembly 25—61 without interrupting the hydraulic connections.

As has been indicated above, the extension 31 of the hydraulic detector means may be subject to the influence of any desired variable factors. If it is desired to eliminate certain undesired movements of an aircraft, then the element 31 can be placed under the influence of a gyroscope, shown schematically at 70 in Figs. 2 and 3. However, any other influences may be used, such as acceleration of the engine, its angular speed, its absolute speed, etc.

The invention is not limited to the above described details since various modifications may be easily made by those skilled in the art. In particular, the detector means 4—11 may be composed of only two pistons defining the intermediate chamber 12, the two outer pistons 8 and 11 being eliminated and being formed simply by portions of the rod 5 itself.

It will be understood that each of the elements described above, or two or more together, may also find a useful application in other types of hydraulic control apparatus differing from the types described above.

While the invention has been illustrated and described as embodied in combined manual and hydraulic control apparatus, it is not intended to be limited to the details shown, since various modifications and structural changes may be made without department in any way from the spirit of the present invention.

I claim:

In a hydraulic control apparatus, in combination, an outer cylinder having an inner surface portion formed with a passage extending axially along said outer cylinder, said outer cylinder having in its interior a chamber spaced from said passage; an inner cylinder slidable in said outer cylinder and having an annular outwardly directed flange slidably engaging the interior of said outer cylinder in said chamber thereof, said flange acting as a piston in said chamber of said outer cylinder, said inner cylinder being formed with a first opening providing communication between said passage and the interior of said inner cylinder, and said inner cylinder being formed with additional openings providing communication between both ends of said flange and the interior of said inner cylinder; a first source of fluid under pressure communicating with said passage of said outer cylinder; a second source of fluid under pressure communicating with said chamber of said outer cylinder; an elongated rod extending axially along the interior of said inner cylinder and carrying a pair of pistons one of which cooperates with said opening of said inner cylinder which communicates with said passage at the inner surface of said outer cylinder and the other of which cooperates with said additional openings of said inner cylinder for directing fluid under pressure from said second source from one to the other end of said flange to move said inner cylinder when the fluid under pressure of said first source changes sufficiently to move said one piston with respect to said opening of said inner cylinder which communicates with said passage, whereby an extremely small amount of fluid of said first source is sufficient to position said other piston with respect to said additional openings for causing the fluid under pressure of said second source to move said inner cylinder with respect to said outer cylinder through a substantial axial distance; and spring means cooperating with said rod for yieldably resisting movement thereof, said inner cylinder, rod, and pistons moving until the resistance produced by said spring means is sufficient to return said one piston to the position it had with respect to said opening of said inner cylinder which communicates with said passage before said one piston was influenced by the change in the pressure of said first source of fluid under pressure.

References Cited in the file of this patent

UNITED STATES PATENTS

| 588,946 | Bergman | Aug. 31, 1897 |
| 618,464 | Kelley | Jan. 31, 1899 |
| 1,628,603 | Ferris | May 10, 1927 |
| 1,718,673 | Wettstein | June 25, 1929 |
| 1,816,787 | Moss | July 28, 1931 |
| 2,210,916 | Kenyon et al. | Aug. 13, 1940 |
| 2,345,531 | Ganahl | Mar. 28, 1944 |
| 2,368,628 | Bates | Feb. 6, 1945 |
| 2,380,705 | Proctor | July 31, 1945 |
| 2,475,313 | Davis | July 5, 1949 |
| 2,516,449 | Coates | July 25, 1950 |
| 2,582,088 | Walthers | Jan. 8, 1952 |
| 2,596,242 | Hill | May 13, 1952 |
| 2,678,177 | Chenery et al. | May 11, 1954 |
| 2,705,940 | Edwards | Apr. 12, 1955 |
| 2,773,660 | Rasmussen | Dec. 11, 1956 |

FOREIGN PATENTS

| 453,928 | Great Britain | 1936 |